United States Patent [19]

Adler

[11] Patent Number: 4,645,870

[45] Date of Patent: Feb. 24, 1987

[54] TOUCH CONTROL SYSTEM FOR USE WITH A DISPLAY PANEL OR OTHER TOUCH CONTROLLED DEVICE

[75] Inventor: Robert Adler, Northfield, Ill.

[73] Assignee: Zenith Electronics Corporation, Glenview, Ill.

[21] Appl. No.: 787,392

[22] Filed: Oct. 15, 1985

[51] Int. Cl.$^4$ .................. G08C 21/00; G06K 11/06
[52] U.S. Cl. ........................ 178/19; 367/907
[58] Field of Search .............. 178/18, 19, 20; 340/365 R, 365 A, 706, 709, 712; 367/138, 117, 127, 907, 71, 72; 333/142; 310/313 A, 313 B, 313 C, 313 D

[56] References Cited

U.S. PATENT DOCUMENTS

| 3,653,031 | 3/1972 | Hlady et al. | 340/347 AD |
|---|---|---|---|
| 3,916,099 | 10/1975 | Hlady | 178/18 |
| 4,403,165 | 9/1983 | Ballato et al. | 310/313 D |
| 4,488,000 | 12/1984 | Glenn | 178/18 |

Primary Examiner—Stafford D. Schreyer

Attorney, Agent, or Firm—Cornelius J. O'Connor

[57] ABSTRACT

Apparatus for use in a touch control system capable of recognizing touch positions along a predetermined coordinate axis on a touch surface comprises a substrate having such a surface that is capable of propagating surface acoustic waves and is so characterized that a touch thereon causes a perturbation of a surface wave propagating through the region of the touch. An input transducer coupled to that surface launches a multiplicity of different frequency SAW's along a first path on the surface. A dispersive array of SAW reflective elements formed along a first path on the substrate surface derives a plurality of different frequency wave components from the launched SAW. Each derived component is reflected from a different location along the array. The components are directed across the touch surface in a progression of paths transverse to and intersecting the coordinate axis so that each path corresponds to a component of a predetermined different frequency·CODE 13TS.

12 Claims, 6 Drawing Figures

TOUCH CONTROL SYSTEM FOR USE WITH A DISPLAY PANEL OR OTHER TOUCH CONTROLLED DEVICE

CROSS-REFERENCE TO RELATED APPLICATION

This application is related to but in no way dependent upon copending application Ser. No. 771,324, filed Aug. 30, 1985 in the name of Rober Adler, copending application Ser. No. 698,306, filed Feb. 5, 1985 in the name of Robert Adler, copending application Ser. No 715,134 filed Mar. 22, 1985 in the names of Michael C. Brenner and James J. Fitzgibbon and copending application Ser. No. 741,975 filed June 6, 1985 in the name of Robert Adler.

BACKGROUND OF THE INVENTION

This invention relates, in general, to a touch control system for a cathode ray tube (CRT), display panel or other touch-controlled device which is capable of recognizing touch positions along a predetermined coordinate axis on a touch surface.

By way of background, in a well-known prior art touch control system adapted for use with a CRT type graphics display device, each of two adjacent edges of the CRT's display surface (faceplate) is provided with a bank of light sources, usually light emitting diodes (LED's), arranged to develop a cluster of parallel light paths which extend across the faceplate, the clusters intersecting, preferably at right angles, to form a grid-type pattern of light paths overlying the display surface. Like banks of light detectors flank those sides of the faceplate opposite the banks of light sources.

In practice, a particular graphic is delivered for display upon the CRT faceplate by a controller in response to an operator's command, which command can take the form of a touching of one area of the faceplate. This touching serves to interrupt one or more of the light beams, which interruption causes the beam's assigned light detector to develop a signal which is applied to the controller to select a particular graphic. U.S. Pat. No. 3,775,560, for example, exemplifies this type of control for a graphics display device. A touch control arrangement of the type adverted to above tends to be rather costly since a separate light sensor is employed for each light source.

It is known to use surface acoustic wave (SAW) energy for touch control. Prior art U.S. Pat. No. 3,134,099-Woo teaches an arrangement in which a plurality of piezoelectric transducers, electrically connected in parallel, is disposed along each of two adjacent edges of a sheet of glass. The transducers are coupled to the sheet and, in response to a control signal, create surface waves which propagate across the surface of the glass sheet. A writing pen, embodying a piezoelectric component, is placed in contact with the glass sheet to sense a propagating disturbance and then issue an appropriate signal to a control unit which measures the elapsed time interval between the time the control signal was applied to the transducer that initiated the disturbance and the time the signal was received by the pen. It is of significance that, in the Woo arrangement, a plurality of piezoelectric transducers is required of each of two adjacent sides of the glass panel. Further, the Woo system requires the use of a special touch stylus capable of sensing surface acoustic waves traveling across the panel.

U.S. Pat. No. 3,653,031-Hlady et al, is addressed to a touch sensitive position encoder also employing elastic surface wave generating transducers positioned along the edges of a sheet of transparent glass. The transducers function as radiators, as well as sensors, and thus serve to launch surface waves across the glass sheet, as well as to receive such waves. In operation, a finger or stylus placed at a particular position on the glass sheet serves to reflect the surface waves encountered. A reflected wave that is detected is applied to timing circuitry associated with the sensors, which circuitry determines the geometric coordinates of the position of the finger or stylus. Again, as in Woo, two arrays, or banks, of transducers are required to create the surface waves that propagate across the glass sheet.

U.S. Pat. No. 3,673,327-Johnson et al, describes still another SAW-type touch responsive panel assembly comprising a panel positioned over the faceplate of a CRT and having a first plurality of transmitters positioned along a first edge of the panel for generating a like plurality of Rayleigh (surface) beams that propagate across the surface of the panel in an X direction and a like plurality of detectors positioned along the edge of the panel opposite said first edge for individually receiving an assigned one of said plurality of beams. In like fashion, a second plurality of transmitters is positioned along a second edge of the panel, adjacent the first edge, for simultaneously generating a second plurality of Rayleigh wave beams that propagate across the panel in a Y direction, perpendicular to the X direction. A like second plurality of detectors is positioned along the edge of the panel opposite said second edge for receiving an assigned one of said second plurality of beams. Accordingly, to establish this X-Y grid of wave beams, a transmitter is required for each wave beam and a separate detector is required for each such transmitter.

Each transmitter, upon actuation, lauches a beam of Rayleigh surface waves along the surface of the panel. Thereafter, when a finger or other object is pressed against the panel, acoustical wave energy is absorbed, thereby interrupting its transmission to its assigned detector. The absence or reduction of the normal signal at a specific detector constitutes a touch indication which is applied to a computer.

However, a principal drawback of the Johnson et al touch control system, like that of its optical counterpart, resides in the requirement of a multiplicity of transmitters and detectors to establish the intersecting wave energy paths that form the grid overlying the panel. The mechanical considerations and cost involved in the practice of utilizing dual pluralities of transmitters and detectors, all of which must be separately wired, are obvious shortcomings.

Other patents in the touch control art are set forth below: U.S. Pat. Nos.:
3,775,560
3,808,364
3,916,099
3,956,745
4,198,623
4,254,333
4,286,289
4,346,376

Additionally, art in the field of surface acoustic waves which was considered included: U.S. Pat. Nos.:
3,883,831

3,975,697
3,978,437
4,403,165
SURFACE WAVE FILTERS, Edited by Herbert Matthews, John Wiley & Sons, 1977.
"Use of Apodized Metal Gratings in Fabricating Low Cost Quartz RAC Filters" by G. W. Judd and J. L. Thoss, Proceedings of the IEEE 1980 Ultrasonics Symposium, p. 343.
"Amplitude Weighting of SAW Reflecting Array Structures" by F. G. Marshall, E. G. S. Paige and A. S. Young, IEEE 1974 Ultrasonics Symposium, p. 202.

OBJECTS OF THE INVENTION

It is a general object of the invention to provide a frequency sensitive touch control system.

It is also a general object of the invention to provide an improved touch control system for use with a display panel or other touch-control device.

It is a specific object of the invention to provide a touch control system in which touch location is resolved without recourse to high-speed electronic circuitry.

It is another object to provide a low cost, compact and highly effective surface acoustic wave touch control system for use with touch controlled devices.

It is another object to provide such a system which is efficient in its use of surface acoustic wave energy.

It is yet another object to provide such a system which is efficient in it utilization of touch surface area.

It is still another object to provide such a system which is readily adaptable for use with a cathode ray tube having a planar or a curved faceplate surface.

BRIEF DESCRIPTION OF THE DRAWINGS

The features of the present invention believed to be novel are set forth with particularity in the appended claims. The invention together with further objects and advantages thereof, may best be understood by reference to the following description taken in conjunction with the accompanying drawings, in the several figures of which like reference numerals identify like elements, and in which:

The present invention has widespread applicability for use with, or incorporation into, cathode ray tubes, display panels and a variety of other controlled devices with and without displays. A preferred touch control system implementing the teachings of the invention has the system incorporated into a CRT display.

As will be described, the system may include a separate substrate defining the touch surface. In the illustrated preferred embodiment to be described, however, the CRT faceplate serves as the substrate defining the touch surface. Thus the controlled device (the CRT display) and the control system are inseparably integrated.

Figure 1:
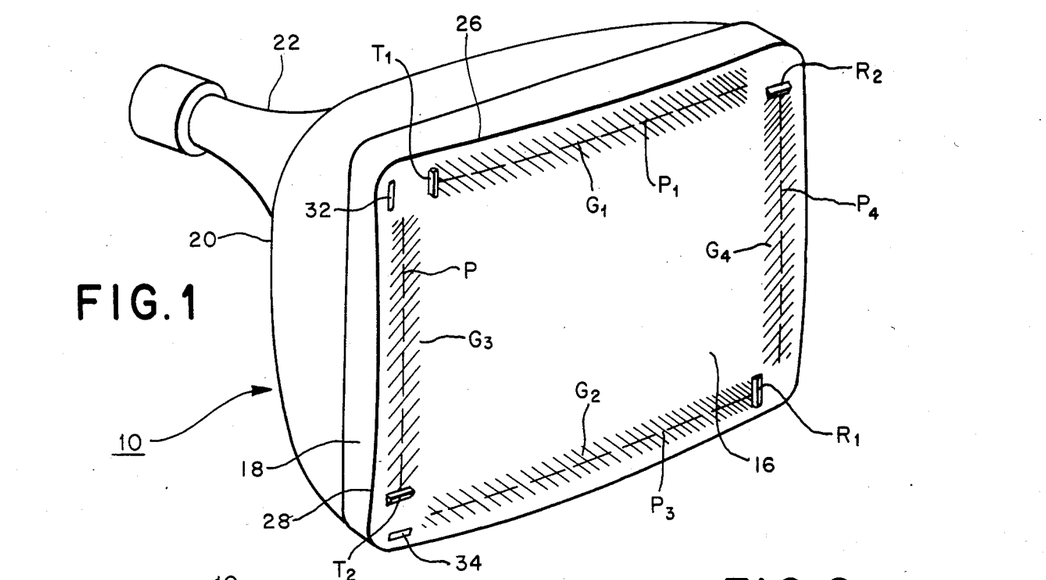
FIG. 1 is a perspective view of a cathode ray tube apparatus constructed in accordance with the invention.
Figure 2:
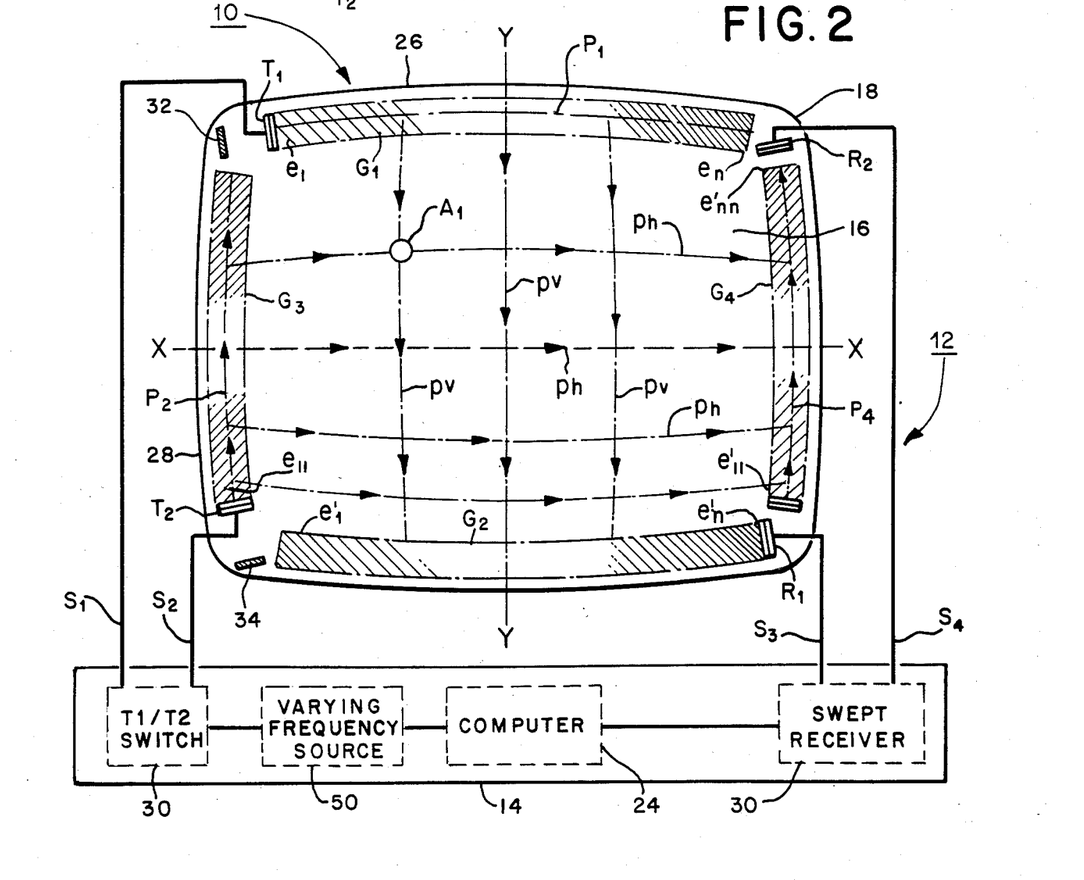
FIG. 2 depicts a conventionally surfaced faceplate of a CRT in elevation.

The illustrated preferred embodiment comprises a novel cathode ray tube (CRT) apparatus 10; see FIGS. 1 and 2. A touch control system 12 according to the invention has a controller 14, subsequently to be described. The system is capable of recognizing touch positions along two predetermined orthogonal coordinate axes (X-Y) on a touch control surface 16, which, in this embodiment, constitutes the front surface of the CRT faceplate 18. For purposes to be explained below, the X-Y axes can be assumed to intersect the geometric center of touch surface 16.

As shown in FIG. 1 the touch control surface 16 is defined by the CRT faceplate, hereinafter at times termed the substrate. In the disclosed embodiment wherein the substrate is a conventional CRT faceplate, the surface 16 may be substantially spherical or biradial. On the other hand, a CRT having a planar faceplate is equally utilizable in practicing the invention. In any event, the faceplate surface is capable of propagating a multiplicity of different frequency surface acoustic waves such that a touch on that substrate causes a perturbation of a surface wave propagating through the region of the touch. CRT apparatus 10 further comprises a funnel 20, the forward end of which may be frit sealed to faceplate 18. The distal end of funnel 20 terminates in a neck section 22 which encloses an electron gun structure (not shown).

Graphics or other information may be ordered up for display from controller 14, FIG. 2, in response to an operator's command. The command can take the form of a touch of a particular area of a menu, or directory, exhibited behind the touch surface. As will be described below, the act of touching surface 16 causes a perturbation of a surface acoustic wave propagating through the region of the touch. In practice, in an X-Y execution of the system, the perturbation is manifested as an interruption or reduction of the wave energy directed along one or more paths that form a grid overlying surface 16. Moreover, in the manner described in the Brenner et al application, the amount of pressure applied to the panel during the act of touching can be utilized to produce a separate control effect. Detection and analysis of such a perturbation serves to identify the X, Y, or other coordinates of the touched area, which information, in turn, is determinative of an output from controller 14 which can be graphics delivered up for display, or some other response. Additionally, the level of pressure of the touch employed to induce the perturbation is subjected to an analysis by the Brenner et al system that can produce an additional control effect.

To this end, the controller 14 for touch control system 12, which is more fully described below, includes a computer 24 for rendering associated circuitry operative in a predetermined sequence so that when a touch-induced perturbation of acoustic wave energy is detected, converted to an electrical signal and fed back to the computer, the location of the touch is identifiable by the computer and converted to a control signal containing information indicative of touch location. As will be shown, these signals are applied to a controlled device, which can be the CRT apparatus 10 adverted to above.

As shown in FIGS. 1 and 2, surface 16 of faceplate 18 supports a first pair of input and output surface wave transducer means T1, R1, respectively, and a second pair of input and output transducer means T2, R2, respectively. Input transducers (transmitters) T1, T2 are mechanically and acoustically coupled to faceplate surface 16 to the end that, when excited, they individually launch surface acoustic waves upon surface 16 along respective paths P1 and P2. Output transducers (receivers) R1, R2 are similarly coupled to surface 16 at the terminal of paths P3 and P4 so that, upon receipt of surface wave energy, they issue individual electrical output signals. In each instance the transducer is disposed perpendicular to the longitudinal axis R of its associated path. In a manner to be described below in connection with the explanation of controller 14, transducers T1, T2, when stimulated by respective input signals S1, S2, each launch a continuous wave surface acoustic wave signal of slowly varying frequency from which a multiplicity of different frequency components are derived and directed across faceplate 16 to the end that a subsequent perturbation of one of such surface wave components can serve to identify the location of the perturbation on the faceplate. Input transducers T1, T2, which are more particularly described below, are mounted upon touch surface 16 adjacent to edges 26 and 28, respectively; see FIG. 2. A source T1/T2 switch 30 associated with controller 14 serves to apply the input signals S1, S2 derived from a varying frequency source, for example, the mixer described below in connection with FIG. 6, to respective transducers T1, T2 enabling them, in response to such signals, to individually launch varying frequency surface acoustic waves along first and second paths P1, P2, respectively, on touch surface 16.

Also as shown in FIG. 2, the output transducers R1, R2 are mounted upon surface 16 at the termini of paths P3 and P4. In a manner to be described, transducers R1, R2, upon receipt of surface waves that experienced a touch-induced perturbation, will develop respective output signals S3, S4 which, when analyzed by receiver means associated with controller 14, will then exhibit a characteristic indicative of the position, or location of the touch on the substrate surface.

Initially, by way of background, wave reflective gratings will be described in a generalized fashion. This introductory description is for the purpose of relating the manner in which touch control is accomplished by recourse to surface acoustic wave technology. However, since the invention contemplates apparatus for launching varying frequency continuous wave SAW's upon a surface 16, it is to be borne in mind that the configuration and orientation of the elements of the gratings employed in practicing the invention will adopt a specific format to be detailed below.

Figure 3:
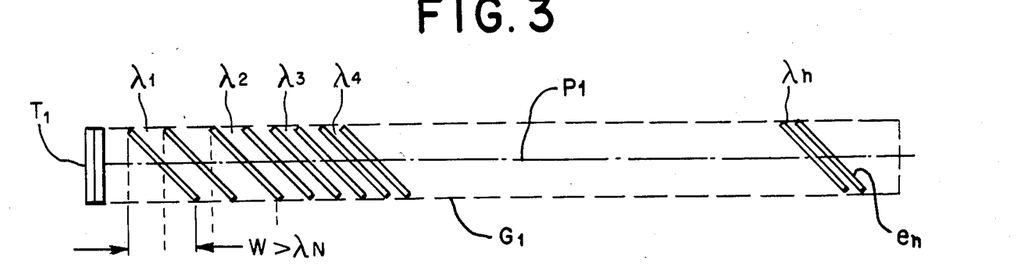
FIG. 3 is a fragmentary sketch of a SAW reflective grating specifically designed for use in a touch control system.

Accordingly, a first reflective grating G1, having an input terminus confronting transducer T1, comprises a dispersive array of wave reflective elements $e_1$ to $e_n$ disposed along path P1 with the spacings between elements $e_1$ to $e_n$ monotonically decreasing from the T1 end of the grating to the opposite end, see FIG. 3. Additionally, each of the aforesaid elements is effectively arranged at a predetermined angle of incidence to the longitudinal axis of path P1. In a preferred execution the angle of incidence of the reflective element at the midpoint of the array, relative to the axis of path P1, is approximately 45 degrees. In the case of acoustic wave propagation across a flat surface, all elements are disposed at substantially 45 degress to the path axis. On the other hand, if wave propagation is across a curved surface, the reflective elements displaced from the midpoint of the array might desirably be angularly disposed to the path axis in the manner taught in the aforementioned Adler application Ser. No. 771,324.

Because of the varying spacing between reflective elements $e_1$ to $e_n$, the array serves to derive from the initially launched varying frequency continuous wave a multiplicity of different frequency wave components and to direct such components across substrate surface 16 along a plurality of paths $p_v$ each disposed at an angle to the axis of path P1. As best depicted in FIG. 2, path $p_v$ paths are so disposed as to intersect the coordinate axis X-X directed through the geometric center of surface 16 at 90 degrees.

As is known it is the nature of a dispersive array to derive a multiplicity of differing frequency wave components from an applied varying frequency signal. A specific application of the invention to a 13" color CRT contemplates a G1 array approximately one-half inch wide and eleven inches long. At this juncture consideration must be given to control of diffraction spread of the derived wave components as they traverse faceplate surface 16. Letting L be the length of array G1 and W the width of distinguishable adjacent paths $p_v$, there are $N = L/W$ parallel $p_v$ paths. Because of the nominal 45 degree angle of the reflector elements, W can be assumed to be equal to the array width, one-half inch in this case. Accordingly, with the assumed length of eleven inches, N=22 adjacent paths.

The relationship $\lambda < W^2/L$ or $\lambda < W/N$ must be observed in order to keep diffraction spread under control. In other words, the width W of a path $p_v$ must contain at least N wavelengths. This must be the situation for the lowest frequency path. To distinguish adjacent paths on the basis of frequency alone, each path must contain a different number of reflecting strips. A difference of one wavelength per path width W is the minimum. Thus, if the first section contains N wavelengths, the second one must contain N+1 and so on until the last one, which contains 2N−1 wavelengths.

As will be shown, Transducer T1 is excited by a multi-frequency source capable of producing energy throughout a predetermined frequency band, e.g., a varying frequency generator, a broad/band noise source, the mixer 50 etc. Turning again to the relationship $\lambda < W/N$, the wavelength for the length or minimum frequency, is determined to be $\lambda_1 < 0.5/22 = 0.023"$. The frequency, $f_1$, having that wavelength is $$f_1 = \frac{3100 \text{ m/sec}}{\lambda_1} = \frac{3100 \text{ m/sec}}{.584 \times 10^{-3} \text{ m}} = 5.3 \text{ MHz}$$

In like fashion, $f_n$, the maximum frequency is found to be $$f_n = f_1 \frac{2N-1}{N} = 5.3 \frac{(43)}{(22)} = 10.36 \text{ MHz}$$

corresponding to a wavelength $$\lambda_n = \frac{3100}{10.36 \times 10^6} = .299 \times 10^{-3} \text{ m, or } .012".$$

In summary, the minimum frequency $f_1$ is determined to be 5 MHz and the maximum frequency $f_n$ is 10 MHz.

Accordingly, in the application herein considered, a varying frequency wave centered at 7.5 MHz and having a band width of 5 MHz is deemed appropriate. To this end an excitation signal, periodically swept from 5 MHz to 10 MHz, is applied to transducer T1. Consonant with such an excitation signal the spacing between adjacent ones of the array elements varies from, commencing at element $e_1$, 0.024" the wavelength $\lambda_1$ for a 5 MHz SAW to 0.012" the wavelength $\lambda_n$ for a 10 MHz SAW, see FIG. 3. It is appreciated, of course, that the grating depiction in FIG. 3 is not drawn to scale, in fact, the spacings $\lambda_1$ through $\lambda_n$ are intentionally exaggerated in order to more clearly portray the varying spatial relation of the reflector elements.

It is appreciated that the element spacing can be varied in the opposite direction, i.e., the first pair of elements confronting the transducer T1 can be spaced to accommodate the highest frequency with successive element spacing or varied monotonically to the distal end of the array to accommodate the lowest frequency utilized.

A second reflective grating G2 likewise comprises an array of reflective elements $e_1'$ to $e_n'$ which are disposed along path P3 and are effectively arranged at predetermined angles of incidence to the longitudinal axis of path P3 for intercepting the wave components extracted from the wave traversing path P1 and directed across surface 16 along the paths $p_v$. Grating G2 intercepts the wave components arriving along paths $p_v$ and redirects them along path P3 toward receiving transducer R1 which converts the wave energy into an electrical output signal S3. Preferably, grating G2 duplicates the configuration of the first reflective grating G1 with oppositely disposed elements of grating G2 disposed at the same angle of incidence to the longitudinal axis of path P3 as their counterparts in grating G1 to facilitate interception and redirecting of wave components arriving from grating G1. It is of significance that gratings G1 and G2 are so arranged upon faceplate 16 that the input and output transducers T1 and T2 are disposed at diagonally opposed corners of the faceplate. This renders the transit time from transducer $T_1$ to transducer $R_1$ the same for all surface wave components, regardless of the specific path $p_v$ they may travel. Since the inventive touch control system herein disclosed is predicted upon detection of touch perturbed surface waves of predetermined differing frequencies, transmit time of a particular wave(s) across the faceplate is of no consequence, as is the case in the copending Adler application Ser. No. 771,324.

The output signal S3 of transducer R1 is coupled to a signal receiver means 30 capable of processing wave energy signals of frequencies throughout the aforementioned predetermined frequency band. Such a receiver means can comprise a narrow band receiver synchronously swept with a time-varying frequency transmitting source 28. In a manner to be described, signal 53 is analyzed to determine if a perturbation of any surface waves transversing paths $p_v$ has occurred.

The above-described transducer pair T1, R1 and gratings G1, G2 serve to establish one portion of a grid of surface wave paths $p_v$ which are disposed across substrate surface 16. A second portion of the grid is established by the second pair of transducers T2, R2 and associated gratings G3, G4. In a manner similar to that described above, transducer T2, in response to a varying frequency continuous wave input signal S2, launches acoustic surface waves along the path P2. The third reflective grating G3 comprises an array of reflective elements $e_{11}$ to $e_{nn}$ which are disposed along path P2 with the elements effectively arranged at predetermined angles of incidence to the axis of path P2. Grating G3 serves to derive from the varying frequency surface wave signal launched by transducer T2 a multiplicity of different frequency wave components and to direct such components across substrate surface 16 along a multiplicity of paths $p_h$ each disposed so as to intersect the coordinate axis Y—Y, also directed kthough the geometric center of surface 16, at a 90 degree angle. Desirably, grating G3 adopts, except for overall length, the same reflector element configuration and angular orientation as that of its counterpart grating G1, see FIGS. 1 and 2.

A fourth reflective grating G4, comprising an array of reflective elements $e'_{11}$ to $e'_{nn}$ is disposed along the path P4 with the mid-point element being arranged at a 45 degree angle to the longitudinal axis of path P4. The reflective elements of grating G4 intercept the wave components directed thereto by the elements of grating G3 along paths $p_h$ and redirect these intercepted components along path P4 to receiving transducer R2. Again, desirably, grating G4 adopts, except for overall length, the same element configuration and angular orientation as that of counterpart G2.

Since transducers T1, T2 may incidentally launch surface acoustic waves along paths P1, P2 in directions opposite from their respective adjoining gratings G1, G3, it is desirable to provide means for suppressing such undesired wave energy. Accordingly, the prevent transducers $T_1, T_2$ from generating undesired acoustic waves in directions opposite the intended directions, a pair of absorbers 32, 34, which can be formed of a soft epoxy, may be mounted upon the display surface immediately behind respective transducers T1 and T2.

In the manner just described, and as depicted in FIG. 2, surface 16 is now provided with an overlying grid comprising a multiplicity of intersecting paths of differing frequency piezoelectric surface wave components with the series $p_v$ being disposed perpendicular to coordinate axis X-X, i.e., the major axis of surface 16 while a second, intersecting series of paths $p_h$ are disposed perpendicular to the minor axis of surface 16. In this fashion intersecting differing frequency wave components traverse the surface of the display device, forming an invisible grid that overlies surface 16.

As will now be described, means are coupled to the input transducer T1, T2 for initiating the launching of surface acoustic waves along paths P1, P2. The application of signals S1, S2 to transducers T1, T2 serves to generate and launch across substrate surface 16 varying frequency elastic (ultrasonic) surface waves having substantially planar wavefronts with uniform amplitude and phase along lines parallel to the initiating transducer. Transducers T1, T2, (as well as R1 and R2) typically, are piezoelectric transducers comprised of a lead zirconate-titanate ceramic mounted upon a prism of lower velocity material, e.g.., Lucite, which effects an efficient electro-mechanical coupling to substrate surface 16.

The generated surface waves launched along paths P1, P2 are eventually received by transducers R1, R2, respectively, and converted to electrically signals S3, S4. A receiver means 38 is coupled to the outputs of receiving transducers R1, R2 to determine, by an analysis of the frequency content of the received wave components, if wave components of a particular frequency have been attenuated, which of course is the manifestation of a touch-perturbed wave component. Since the spacing along the X-coordinate of the reflective elements of grating G1, for example, is known, the frequency of derived wave components traversing specific paths $p_v$, as well as the location of such paths along the X axis, are also known. For example, the element spacing may decrease hyperbolically from left to right, corresponding to a linear increase of frequency versus position. By detecting the frequency of an attenuated wave component, the location of the touch along the X axis is established. In such a one-coordinate system, for example, in order to identify the X coordinate for the location of the path of a perturbed wave component along the horizontal axis, as viewed in FIG. 2, the receiver 38 is arranged to make a frequency analysis of the surface wave components received by transducer R1. To this end, the receiver analysis commences at the instant the input signal S1 having been applied to transducer T1 to launch a surface wave, arrives at receiving transducer R1. On the frequency scale of FIG. 4 there is plotted the response of acoustic wave components arriving at transducer R1.

Figure 6:
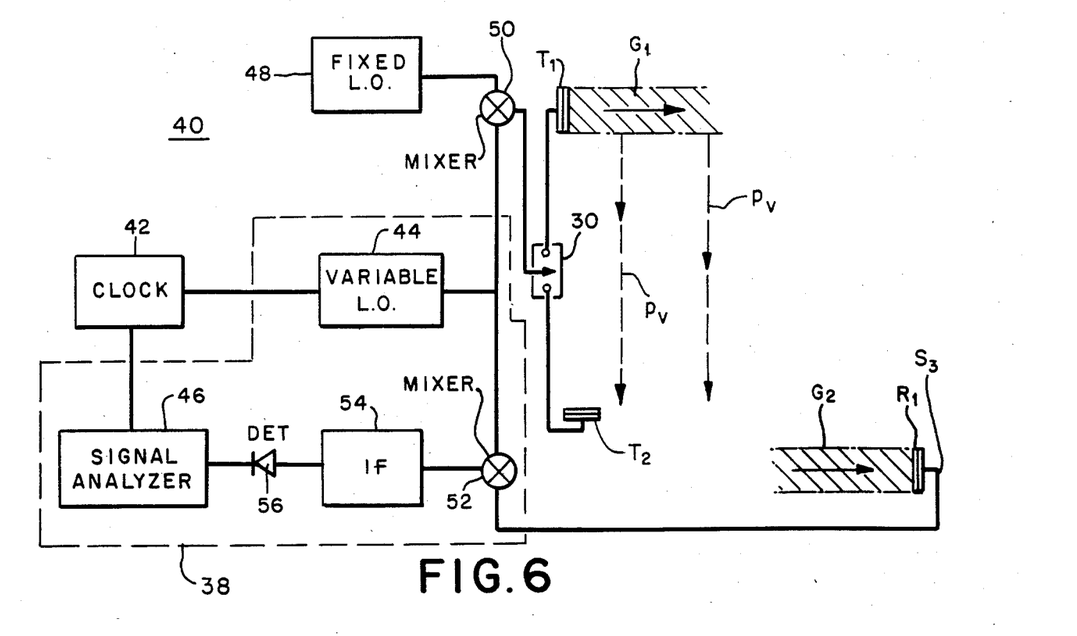
FIG. 6 is a block diagram of a frequency analyzer adopting a superheterodyne format.

A specific receiver means 38 for analyzing the frequency content of the excitation signal and that of output signal S3, for example, to develop a control signal indicative of the frequency of a touch-perturbed acoustic wave and therefore which path was traversed by the touch-perturbed wave, is depicted in FIG. 6. A frequency analyzer 40, adopting a superheterodyne format, includes a clock 42 that initiates a sweep of a variable local oscillation 44 across the frequency band of 20-25 MHz. Simultaneously, the clock signal is applied to a signal analyzer 46 to ensure synchronism with oscillator 44. A fixed local oscillator 48 applies a 15 MHz signal to one input of mixer 50 while variable oscillator 44 applies its 20-25 MHz swept signal to a second input terminal of mixer 50.

Figure 4:
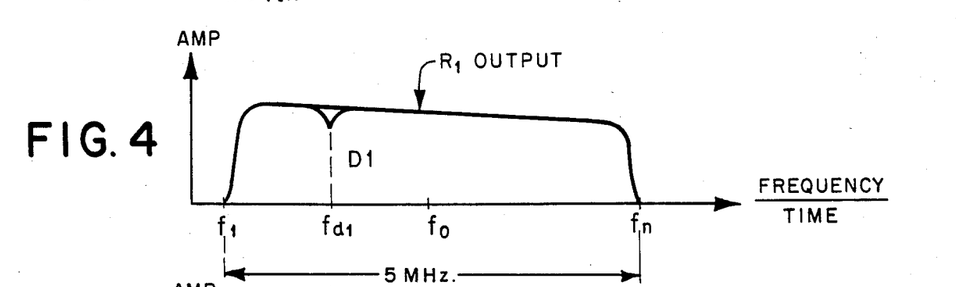
FIG. 4 is a graphical plot representative of received surface acoustic wave energy traversing one coordinate of the faceplate touch surface shown in FIG. 2.

The output terminal of mixer 50 supplies, via switch 30, a difference signal, swept from 5 to 10 MHz, to input transducer T1 which launches surface acoustic waves along dispersive array G1. Different frequency components of the launched wave propagate across substrate 16 and are intercepted and redirected by grating G2 toward receiving transducer R1. Receiving transducer R1 converts the received swept acoustic wave signal to the electrical output signal S3 which is applied to swept receiver 38 via a second mixer 52. Specifically. the output signal of mixer 52, which is graphically depicted in FIG. 4, is coupled via an IF amplifier 54 and an envelope detector on 56 to an input terminal of analyzer 46. This analyzer determines, by scrutinizing the detector output, the frequency of a perturbed acoustic wave component. The output of analyzer 46 is applied to computer 24 which has, in its memory, the position along coordinate axis X-X of acoustic waves corresponding in frequency to a detected perturbed wave.

Controller 14, in response to th position information, supplied by computer 24, outputs a control signal to alter the graphics on display surface 16 to correspond to that of a menu or other directory for the particular display location that was touched.

The controller 14 will ignore any signal having a frequency outside the previously mentioned 5 MHz to 10 MHz spectrum. Assuming for the moment, that no disturbance or perturbation of the derived surface wave components is experienced, the output of transducer R1, as analyzed by receiver 38, might exhibit the solid line response shown in FIG. 4. Depicted therein is a waveform having a relatively constant amplitude extending from 5 MHz, f1 to 10 MHz, fn. This response is established by virtue of the fact that surface wave energy is continually received by the R1 transducer. In the absence of a perturbation, the output of transducer R1, when analyzed by receiver 38 will be so interpreted by controller 14 as to supply a signal to its computer 22 which is indicative of the fact that an uninterrupted train of varying frequency surface waves covering the spectrum between 5 and 10 MHz traversed substrate surface 16 without interference. The computer relays this information to the controlled device (CRT apparatus 10) which, in turn, maintains the pre-existing condition on the surface 16 undisturbed.

Assuming now that an operator wished to select a graphic other than that being displayed, a menu, such as a chart or other type of directory, would indicate which particular area of surface 16, should be touched to call up the desired graphic. Accordingly, assuming that the particular area is that designated A1 in FIG. 2, the operator then inserts his finger into the grid of intersecting surface waves by touching the surface 16 at A1, which action causes a portion of the acoustic surface wave energy traversing the touched area to be absorbed. This act of touching is best explained, and manifested, by reference again to FIG. 4 which depicts the effect upon the output of R1 attributable to a perturbation of the surface wave components traversing the display surface in the vicinity of area A1. This effect is manifested in the waveform as a dip D1 along the frequency axis at $fd_1$ which corresponds to the point where the operator touches surface 16. The depth of the dip is indicative of the pressure that the operator applied during his touch. Let us assume that the point of touch occurred approximately one-fourth of the distance along the major axis of the display surface commencing from the left side, as viewed in FIG. 2. As previously noted, the spatial format of grating G1 is known, therefore the aforesaid "one-fourth" point corresponds to a particular frequency path, which information is stored in computer 24, as are the locations of the other frequency paths intersecting horizontal axis X-X.

Figure 5:
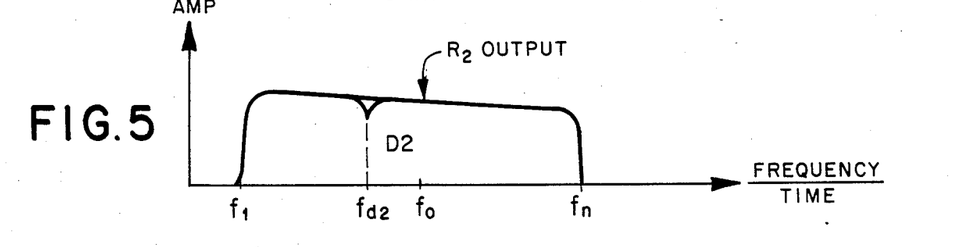
FIG. 5 is a graphical plot representative of received surface acoustic wave energy traversing a second, orthogonal, coordinate of the faceplate touch surface shown in FIG. 2.

Preferably, a short time after T1 launched a varying frequency surface wave, a like wave is launched by transmitter T2 and reflected by gratings G3 and G4 to return the differing frequency components of that wave to receiver R2. In a manner similar to that described above with reference to a perturbation detected by R1, the surface wave components now traversing a path $p_h$ parallel to the major axis of the display surface are detected by R2 and receiver 38 which determine the occurrence of and the frequency of a touch-perturbed wave component, and this perturbation is manifested in FIG. 5 as a dip D2 along the frequency axis at $fd_2$ which corresponds to the point along the Y-axis where the touch occurred. Again, the depth of D2 is indicative of touch pressure. Applying this frequency-related information to that developed relative to the other axis, the computer informs the controlled device of the coordinates of the perturbation (touching at A1) so that that device may deliver for display upon the CRT screen the particular graphics associated or assigned to the location at which the the touching occurred.

The combination of a source of time-varying frequency with a synchronously swept receiver, and particularly the superheterodyne version described in connection with FIG. 6, can be operated over a wide range of sweep speeds, i.e., rates of frequency change per unit time. Preferably, a slow speed is chosen; for example, if a response time of 100 milliseconds for the entire touch system is deemed fast enough, each of the two coordinates in the X-Y execution might be assigned 40 milliseconds, leaving 20 milliseconds for the computer. By way of comparison, in the system described in U.S. patent application Ser. No. 715,134 previously referenced, which uses a short burst of surface waves and derives position information from the difference in transit time between differing positions, the total time interval for one coordinate is determined by surface wave velocity and mechanical dimensions, and is typically less than 200 microseconds. The time-varying frequency system, while still fast enough for all practical purposes, gives its electronic circuits about 200 times more time, with the result that the least costly components can be used and that signal-to-nose ratio is improved.

However, allowance must be made for the acoustic transit time during which the frequency of variable local oscillator 44 will change by a small amount. Specifically, the frequency of oscillator 44 should be offset from the frequency of oscillator 48 by the amount of which oscillator 44 changes during the aforesaid acoustic transit time.

Such a system involving a source of a single frequency, varying in time, is however only one possible embodiment of the inventive concept. For example, a source of broad-band power, even random noise, covering the selected frequency band may be used as the transmitter, and a spectrum analyzing means either of the swept type or of the simultaneous type may serve as the receiver. A broad-band receiver including a band of bandpass filters is an example of the simultaneous type. Generally, any means for detecting a change in the frequency response of the composite dispersive array, i.e. the total path from input to output transducer, may be used to determine the position of the disturbed surface acoustic wavepath.

It is recognized that simultaneous operations to identify both coordinates are possible, but the preferred mode of operation is to alternate between the two. The latter practice eliminates crosstalk problems and makes it possible to economize by switching certain circuit elements between coordinate identifying channels, instead of duplicating such elements. Such alternate operation is readily achieved by resort to the T1/T2 switch 30 which selectively coupled the varying frequency source 50 between transducers T1 and T2.

The above-described gratings G1-G4 can be readily formed by a silk-screening technique in which a frit (solder glass) material is deposited in a selected pattern on surface 16. In order to conserve launched acoustic wave energy, and maintain a constant power density as the SAW traverses a grating, the actual element configurations for the grating patterns employed may utilize various methods of element weighting Consider a basic reflective array comprising a multiplicity of surface wave reflecting fingers (elements), each disposed at approximately 45 degrees to the longitudinal axis of the path they define. Desirably, the spacing, or pitch, between adjacent elements should vary hyperbolically so that the spacing of the elements assigned to a particular transverse path ($p_v$ or $p_h$), represents one wavelength of the surface acoustic wave to be reflected whose frequency varies linearly along the array. Desirably, the reflected wave components traversing the display surface should be characterized by a substantially constant power density, as graphically depicted in FIGS. 4 and 5. Tailoring the arrays of reflective elements to achieve this constant power density is known in the SAW art. In fact, Chapter 9 authored by Richard C. Williamson in the above cited Surface Wave Filter text, is specifically addressed to the design of weighted reflective arrays to accomplish that purpose.

While a particular embodiment of the invention has been shown and described, it will be obvious to those skilled in the art that changes and modifications may be made without department from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined by the following claims when viewed in their proper perspective against the prior art.

I claim:

1. In a touch control system for a display panel or other touch-controlled device which is capable of recognizing touch positions along a predetermined coordinate axis on a touch surface, the apparatus comprising:
   a substrate having a touch surface capable of propagating surface acoustic waves such that a touch on said surface causes a perturbation of a surface wave propagating through the region of the touch;
   input surface wave transducer means mechanically and acoustically coupled to said touch surface of said substrate and utilizable, when excited, for launching a multiplicity of different frequency surface acoustic waves on said touch surface along a first path on said surface; and
   means including a dispersive array of surface wave reflective elements formed on or in said touch surface of said substrate along said first path for deriving from said launched multiplicity of surface acoustic waves a plurality of different frequency wave components, each component being reflected from said array at a different location along the array, and for directing said components across said touch surface of said substrate in a progression of paths transverse to and intersecting said coordinate axis, each of said paths individually coordinating to a component of a predetermined different frequency.

2. Apparatus as set forth in claim 1 in which a characteristic of said array progressively varies from an array terminus confronting said transducer means to the opposite end of said array.

3. Apparatus as set forth in claim 1 in which the spacing between successive ones of said array elements varies monotonically along said array.

4. Apparatus as set forth in claim 3 in which said array elements are weighted to obtain substantially constant acoustic power density of said frequency components.

5. Apparatus as set forth in claim 4 in which said dispersive array elements comprise deposited strips of frit.

6. Apparatus as set forth in claim 1 in which said dispersive array elements comprise surface wave reflective grooves formed on said touch surface.

7. In a touch control system for a display panel or other touch-controlled device which is capable of recognizing touch positions along a predetermined coordinate axis on a touch surface, the apparatus comprising:
  a substrate having a touch surface capable of propagating surface acoustic waves such that a touch on said surface causes a perturbation of a surface wave propagating through the region of the touch;
  input surface wave transducer means mechanically and acoustically coupled to said touch surface of said substrate and utilizable, when excited, for launching a multiplicity of different frequency surface acoustic waves on said touch surface along a first path on said surface;
  means including a first dispersive array of surface wave reflective elements formed on said touch surface of said substrate along said first path for deriving from said launched multiplicity of surface acoustic waves a plurality of different frequency wave components and for directing said components across said touch surface of said substrate in a progression of paths transverse to and intersecting said coordinate axis, each of said paths individually corresponding to a component of a predetermined different frequency and associated with an assigned position along said coordinate axis on said touch surface;
  output surface wave transducer means mechanically and acoustically coupled to said touch surface of said substrate for receiving said wave components derived from said surface acoustic waves; and
  means including a second dispersive array of surface wave reflective elements formed on said touch surface of said substrate along a second path for intercepting said plurality of wave components directed across said touch surface and for redirecting said intercepted components toward said output transducer.

8. For use with a display panel or other touch-controlled device, a system which is capable of recognizing touch positions along a predetermined coordinate axis on a touch surface of such panel or device, said system comprising:
  a substrate having a touch surface capable of propagating surface acoustic waves such that a touch on said surface causes a perturbation of a surface wave propagating through the region of the touch;
  input surface wave transducer means mechanically and acoustically coupled to said touch surface of said substrate for launching a signal comprising a multiplicity of different frequency surface acoustic waves on said touch surface along a first path on said surface;
  means including a first dispersive array of surface wave reflective elements formed on said touch surface of said substrate along said first path for directing wave components of different frequencies derived from said signal across said touch surface of said substrate in a progression of paths transverse to and intersecting said coordinate axis, each of said paths individually corresponding to a component of a predetermined different frequency and associated with an assigned position along said coordinate axis on said touch surface;
  output surface wave transducer means mechanically and acoustically coupled to said touch surface of said substrate for receiving wave components derived from said launched signal and for developing an output signal therefrom;
  means including a second dispersive array of surface wave reflective elements formed on said touch surface of said substrate along a second path for intercepting said derived wave components and for redirecting said intercepted components toward said output transducer; and
  circuit means coupled to said input transducer means for applying an excitation signal to said input transducer,
  said circuit means including means coupled to said output transducer means for detecting a change in the frequency response of the composite dispersive array to develop a control signal indicative of the frequency of a touch-perturbed wave component and thus determinative of which of said transverse paths was traversed by said touch-perturbed wave component and thereby the location of the touch along said coordinate axis of said touch surface.

9. A system as set forth in claim 8 in which said circuit means coupled to said input transducer comprises a swept continuous wave transmitter and said means coupled to said output transducer comprises a receiver synchronously swept with said transmitter.

10. A system as set forth in claim 9 in which said signal receiver means comprises a spectrum analyzer.

11. For use with a display panel or other touch-controlled device, a system which is capable of recognizing touch positions along a predetermined coordinate axis on a touch surface of said panel or device, said system comprising:
  a substrate having a touch surface capable of propagating surface acoustic waves such that a touch on said surface causes a perturbation of a surface wave propagating through the region of the touch;
  input surface wave transducer means mechanically and acoustically coupled to said touch surface of said substrate and utilizable, when excited, for launching signal comprising a multiplicity of different frequency surface acoustic waves on said touch surface along a first path on said surface;
  means including a first dispersive array of surface wave reflective elements formed on said touch surface of said substrate along said first path for directing wave components of different frequencies derived from said signal across said touch surface of said substrate in a progression of paths transverse to and intersecting said coordinate axis, each of said paths individually corresponding to a component of a predetermined different frequency and associated with an assigned position along said coordinate axis on said touch surface;
  output surface wave transducer means mechanically and acoustically coupled to said touch surface of said substrate for receiving wave components derived from said launched signal and for developing an output signal;
  means including a second dispersive array of surface wave reflective elements formed on said surface of said substrate along a second path for intercepting said derived wave components and for redirecting said intercepted components toward said output transducer; and
  signal generating means, for producing wave signal energy throughout a predetermined frequency band, coupled to said input transducer means for exciting said input transducer;
  signal receiver means coupled to said output transducer means for detecting a change in the frequency response of the composite dispersive array develop an output indicative of the frequency of a touch-perturbed wave component and thus determinative of which of said transverse paths was traversed by said touch-perturbed wave component and thereby the location of the touch along said coordinate axis of said touch surface.

12. A system as set forth in claim 11 in which said signal generating means comprises a noise generator.

* * * * *